Patented May 31, 1932

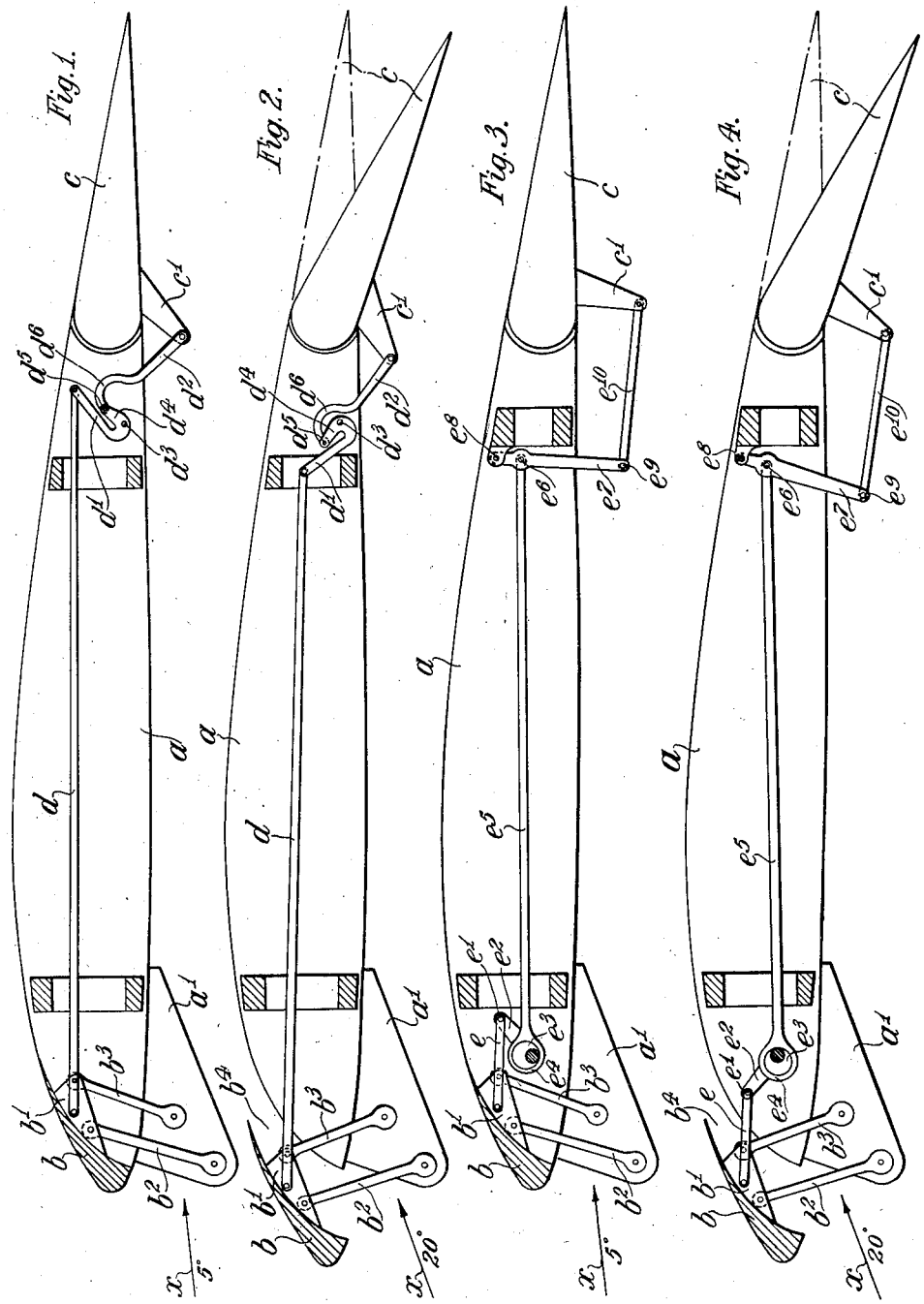

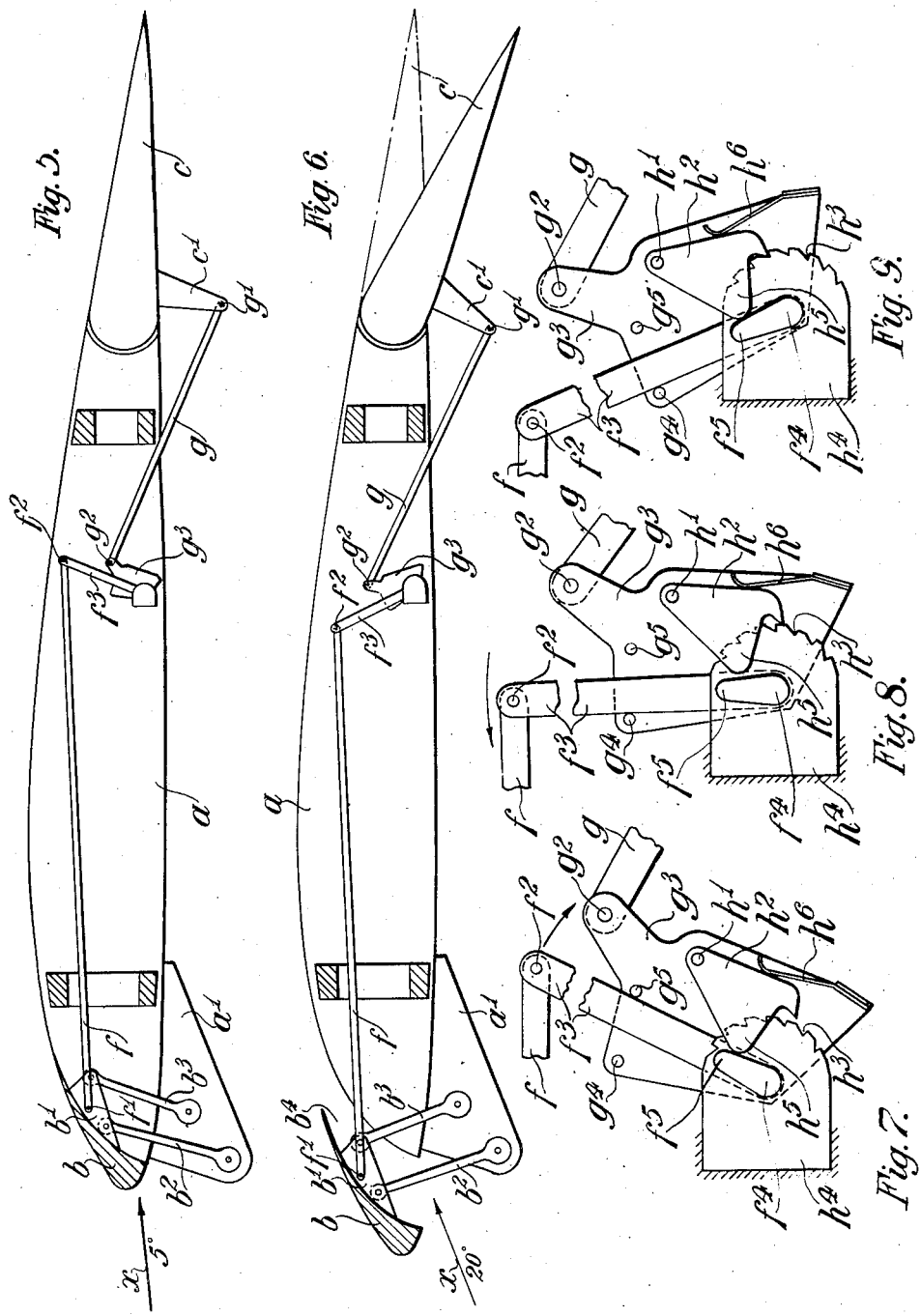

1,861,318

UNITED STATES PATENT OFFICE

FREDERICK HANDLEY PAGE, OF LONDON, ENGLAND, ASSIGNOR TO HANDLEY PAGE LIMITED, OF LONDON, ENGLAND

MEANS FOR CONTROLLING AEROPLANES

Application filed December 1, 1931, Serial No. 578,367, and in Great Britain January 23, 1931.

This invention relates to slotted wings for aircraft in which the slat which is automatically operable by the air forces on it in accordance with the change in angle of incidence of the wing to which the slat is fitted, is employed to operate a flap at the after part of the wing in such a manner that with the opening of the slot by the automatic forward adjustment of the slat, the flap is angularly adjusted from a small incidence position to a high incidence position, in proportion as the slat itself is automatically advanced.

A "slat" is now the recognized term for an adjustable "forwardly located wing" or "auxiliary wing", which nests on the front of a main wing and which advances to open a slot when the angle of incidence increases so as to approach the stalling angle.

We have found that the air forces acting on the slat, although ample for the purpose of causing it to open and also for the purpose of causing it angularly to adjust the flap when the wing is at considerable flying angles, diminish as an excessive stalling angle is approached, while at the same time the hinge moment of the flap increases, until a critical position is arrived at, where the hinge moment of the flap overcomes the forces operating on the slat, with the result that the flap may rise and pull the slat back to the wing and thus close the slot.

The object of the present invention is so to interconnect the slat and the flap that the movements of the slat are imparted to the flap, but so that the flap before its turning moment attains a value sufficiently high to overcome the slat opening forces, is prevented from imposing its movements or tendency to move upon the slat.

The connecting mechanism in accordance with the present invention so connects the slat with the flap that, while permitting the flap to be operated by the slat, the flap is prevented under all conditions from operating to close the slot.

The invention will now be more particularly described with reference to the embodiments illustrated in the accompanying drawings, in which:—

Fig. 1 is a diagrammatic sectional view illustrating a wing in which the slat is connected to the flap through pivoted toggles. In the position illustrated the slat is against the wing and the flap is in its small incidence position.

Fig. 2 is a similar view of the same wing as shown in Fig. 1 with the slat drawn away from the wing to a maximum extent and showing the flap adjusted to its high incidence position.

Figs. 3 and 4 are similar views to Figs. 1 and 2 respectively, but illustrating an eccentric in the connection between the slat and the flap.

Figs. 5 and 6 are similar views to Figs. 1 and 2 respectively indicating diagrammatically a self-release locking mechanism in the connections between the slat and the flap.

Figs. 7, 8 and 9 are detailed views of the self-release locking mechanism employed in Figs. 5 and 6 drawn to an enlarged scale, showing this mechanism in three successive positions.

The direction of the airflow is indicated in Figs. 1–6 by the arrow $x$ and an indication of the angular relationship of the airstream to the chord of the wing is marked against the arrow in each view.

Referring to the construction shown in Figs. 1 and 2, $a$ is the main wing, $b$ is the slat and $c$ is the flap.

The slat $b$ is provided with a bracket $b^1$ to which is pivotally connected the upper ends of two links $b^2$, $b^3$, the lower ends of which are pivotally mounted upon a bracket $a^1$ fixed on the wing $a$. In this manner the slat $b$ is free to move under the influence of change in air pressures towards and away from the wing. When the slat advances into the forward position shown in Fig. 2 it opens a slot $b^4$ between itself and the wing.

The flap $c$ is mounted so that it can be moved from the small incidence position shown in full lines in Fig. 1 to the high incidence position shown in full lines in Fig. 2.

The connecting mechanism between the slat and the flap comprises connecting members $d$, $d^1$, $d^2$ and the arm $c^1$ on the flap $c$. The connecting member $d$ is a rod pivoted at its forward end to the bracket $b^1$ and at its rearward end to the connecting member $d^1$ which constitutes one part of a toggle. This part toggle $d^1$ is pivotally mounted at $d^3$ and is formed with a crank portion $d^4$, the end of which is pivotally connected at $d^5$ to one end of the other part toggle $d^2$. The part toggle $d^2$ adjacent to the end which is pivoted at $d^5$ is bent at $d^6$ to clear the crank portion $d^4$. The arrangement is such that as the slat advances and pulls down the flap, as shown in Fig. 2, the toggle parts $d^1$, $d^2$ cross over dead points and thus prevent the flap overpowering the slat so as to move it towards the wing to close the slot.

In the construction shown in Figs. 3 and 4, the connecting mechanism comprises a link $e$ pivoted at its forward end to the bracket $b^1$ and pivoted at its rearward end at $e^1$ to an arm $e^2$ formed on an eccentric $e^3$. An eccentric strap $e^4$ is formed on the forward end of a rod $e^5$ which is pivoted at its rearward end at $e^6$ to a lever $e^7$. The lever $e^7$ is pivoted at $e^8$ and is connected at its free end at $e^9$ by a link $e^{10}$ to the arm $c^1$ on the rear flap $c$. The arrangement is such that, as the slat advances, the eccentric $e^3$ is angularly adjusted to move the rod $e^5$ forward and thus pull the flap into the high incidence position shown in Fig. 4. In this position the eccentric moves over dead points and thus prevents any tendency of the flap to move the slat towards the wing in the direction to close the slot.

In the construction shown in Figs. 5 to 9, a rod $f$ is pivotally mounted at its forward end at $f^1$ to the bracket $b^1$ of the slat and at its rearward end at $f^2$ to an arm $f^3$. A link $g$ is pivoted at one end $g^1$ to the arm $c^1$ of the flap and at its other end $g^2$ to a lock member $g^3$. The lock member $g^3$ has pivotally mounted thereon at $h^1$ a pawl $h^2$ which is adapted to engage with ratchet teeth $h^3$ on a part $h^4$ fixed to the wing. The arm $f^3$ and lock membe $g^3$ are both pivotally mounted to turn about a common axis $f^4$ and the lock member $g^3$ is provided with stops $g^4$, $g^5$ located on either side of the arm $f^3$, which stops allow a limited amount of lost motion between the arm $f^3$ and lock member $g^3$, beyond which movement of the arm $f^3$ will produce corresponding movement of the lock member $g^3$. The arm $f^3$ is formed with a release extension $f^5$ which is adapted to engage with a projecting part $h^5$ of the pawl $h^2$.

Fig. 7 illustrates the action of the self-release locking mechanism when the slat moves towards the wing from the position shown in Fig. 6 to the position shown in Fig. 5, in which case the arm $f^5$ moves the pawl $h^2$ and holds this pawl out of engagement with the ratchet teeth $h^3$ against the action of the spring $h^6$ while the arm $f^3$ through the stop $g^5$ and lock member $g^3$ causes the link $g$ to be moved in the direction of the arrow to adjust the flap $c$ to its small incidence position shown in Fig. 5. The operation of the self-release locking mechanism when the slat moves in a reverse direction from the position shown in Fig. 5 to the position shown in Fig. 6 is illustrated in Fig. 8, in which the arm $f^3$ by contacting with the stop $g^4$, moves the lock member $g^3$ and link $g$ in the direction of the arrow to adjust the flap $c$ into the high incidence position shown in Fig. 6. This movement of the lock member $g^3$ is permitted by the pawl $h^2$ tripping over the ratchet teeth $h^3$. Fig. 9 shows the self-release locking mechanism when this arrives at the position shown in Fig. 6, in which the slat is away from the wing to a maximum extent and the flap is in its high incidence position. In this case the pawl $h^2$ is in engagement with the ratchet teeth so as to resist any movement of the lock member $g^3$ in a clockwise direction such as would be caused by a turning adjustment of the flap tending to react on the slat to close the slot.

Instead of providing a pawl and ratchet mechanism for obtaining a locking effect, this effect may be secured by means of an equivalent intercepting or braking mechanism operated immediately prior to the turning moment of the flap attaining a value sufficiently high to overcome the slat operating forces.

It should be clearly understood that the flap is continually pressed upward by the air flow under all flying conditions, and consequently the flap presses continually in the direction to close the slot. The interconnecting mechanism is therefore kept taut which ensures smooth working when the slot opens and the slat draws down the flap against its own air resistance. It is only with continued increase in the angle of incidence of the wing after the slot is completely open that the flap might overpower the slat at the very time when it is most important that the slot should remain open. The safety locking mechanism interposed in the connections between the slat and the flap locks the connections during the last portion of the movement of opening the slot and leaves the mechanism locked during the completely open position in order to remove the danger of the flap closing the slot. As soon as the slat moves back from its completely open position, the safety locking mechanism is again unlocked so that both the slat and the flap may return to the closed and small incidence positions respectively when the angle of incidence has decreased with the increased speed of the wing.

What I claim as my invention and desire to secure by Letters Patent is:—

1. In aeroplanes, the combination of wings, slats freely and independently movable towards and away from said wings within prescribed limits by the action of the air pressure on said slats, rearwardly located flaps, and means for connecting said slats with said flaps adapted to draw a flap into a high incidence position when its slat moves away from the wing, said means constructed to prevent a flap from moving its slat towards the wing when said slat is in its forward position.

2. In aeroplanes, the combination of wings, slats freely and independently movable towards and away from said wings within prescribed limits by the action of the air pressure on said slats, rearwardly located flaps, means for connecting said slats with said flaps adapted to draw a flap into a high incidence position when its slat moves away from the wing, and toggles interposed in said means adapted to cross over dead points in order to prevent a flap from moving its slat towards the wing when said slat is in its forward position.

3. In aeroplanes, the combination of wings, slats freely and independently movable towards and away from said wings within prescribed limits by the action of the air pressure on said slats, rearwardly located flaps, means for connecting said slats with said flaps adapted to draw a flap into a high incidence position when its slat moves away from the wing, and eccentrics in said means adapted to cross over dead points in order to prevent a flap from moving its slat towards the wing when said slat is in its forward position.

4. In aeroplanes, the combination of wings, slats freely and independently movable towards and away from said wings within prescribed limits by the action of the air pressure on said slats, rearwardly located flaps, means for connecting said slats with said flaps adapted to draw a flap into a high incidence position when its slat moves away from the wing, and locking mechanism in said means adapted to prevent a flap from moving its slat towards the wing when said slat is in its forward position.

5. In aeroplanes, the combination of wings, slats freely and independently movable towards and away from said wings within prescribed limits by the action of the air pressure on said slats, rearwardly located flaps, means for connecting said slats with said flaps adapted to draw a flap into a high incidence position when its slat moves away from the wing, and locking mechanism in said means adapted to lock said means and thus prevent a flap from moving its slat towards the wing when said slat is in its forward position, and to release said means when said slat moves back towards the wing.

6. In aeroplanes, the combination of wings, slats freely and independently movable towards and away from said wings within prescribed limits by the action of the air pressure on said slats, rearwardly located flaps, a pivoted arm connected to each slat, a pivoted lock member connected to each flap and connected to said pivoted arm with lost motion, a pawl on said pivoted lock member, fixed ratchet teeth adapted to be engaged by said pawl to prevent a flap from moving its slat towards the wing but permit a flap to be moved into its high incidence position by movement of its slat away from the wing and a release extension on said pivoted arm adapted, when the pivoted arm is moved relatively to the lock member by the slat moving towards the wing, to disengage the pawl from said ratchet teeth and allow the flap to return to its small incidence position.

In witness whereof I have hereunto set my hand.

FREDERICK HANDLEY PAGE.